(12) United States Patent
Deller et al.

(10) Patent No.: US 6,377,163 B1
(45) Date of Patent: Apr. 23, 2002

(54) POWER LINE COMMUNICATION CIRCUIT

(75) Inventors: Robert W. Deller, Santa Clarita; Robert C. Heagey, Acton, both of CA (US)

(73) Assignee: HOME TOUCH LIGHTING SYSTEMS LLC, Salt Lake City, UT (US)

(*) Notice: Subject to any disclaimer, the term of this patent is extended or adjusted under 35 U.S.C. 154(b) by 0 days.

(21) Appl. No.: 09/666,433

(22) Filed: Sep. 21, 2000

(51) Int. Cl.[7] ................................. H04B 1/00
(52) U.S. Cl. ..................... 340/310.01; 340/310.02; 340/310.03; 375/259
(58) Field of Search .............. 340/310.01, 310.02, 340/310.03, 310.04, 310.05, 310.06; 375/259

(56) References Cited

U.S. PATENT DOCUMENTS

| | | | |
|---|---|---|---|
| 3,445,814 A | 5/1969 | Spalti | 340/310.01 |
| 3,558,902 A | 1/1971 | Casey | 307/114 |
| 3,594,584 A | 7/1971 | Woods | 307/3 |
| 3,689,886 A | 9/1972 | Durkee | 340/310.01 |
| 4,031,528 A | 6/1977 | Harrison | 307/248 |
| 4,060,735 A | 11/1977 | Pascucci et al. | 307/3 |
| 4,090,184 A | 5/1978 | Hamilton, II | 307/3 |
| 4,217,646 A | 8/1980 | Caltagirone et al. | 340/310.01 |
| 4,418,333 A | 11/1983 | Schwarzbach et al. | 340/310.01 |
| 4,423,477 A * | 12/1983 | Gurr | 363/54 |
| 4,429,299 A * | 1/1984 | Kabat et al. | 340/310.06 |
| 4,520,488 A | 5/1985 | Houvig et al. | 375/5 |
| 4,602,240 A * | 7/1986 | Perkins et al. | 340/310.07 |
| 4,714,912 A * | 12/1987 | Roberts et al. | 340/310.02 |
| 4,719,616 A | 1/1988 | Akano | 370/11 |
| 4,755,792 A | 7/1988 | Pezzolo et al. | 340/538 |
| 4,992,774 A | 2/1991 | McCullough | 340/310.01 |
| 5,227,762 A | 7/1993 | Guidette et al. | 340/538 |
| 5,391,932 A | 2/1995 | Small et al. | 307/125 |
| 5,689,230 A | 11/1997 | Merwin et al. | 340/310.01 |
| 5,742,225 A | 4/1998 | Wetzel et al. | 340/310.02 |
| 5,815,067 A | 9/1998 | Knoble et al. | 340/310.01 |
| 5,828,293 A | 10/1998 | Rickard | 340/310.04 |

FOREIGN PATENT DOCUMENTS

DE 2005668 9/1970

* cited by examiner

*Primary Examiner*—Donnie L. Crosland
(74) *Attorney, Agent, or Firm*—Fulbright & Jaworski L.L.P.

(57) ABSTRACT

A power line communication circuit comprises a rectifier connected to an a.c. power line utility source. The rectifier draws power from the a.c. power source and produces a low-frequency rectified d.c. voltage signal across its positive and negative output terminals with the negative output terminal being referenced as a circuit ground. The rectified d.c. voltage signal is received by a voltage-to-current converter connected to the positive output terminal of the rectifier. The voltage-to-current converter also receives a high-frequency a.c.-shaped communication input voltage signal from an external high-frequency a.c.-shaped communication signal generator. In response to the two input voltage signals, the voltage-to-current converter generates an output current which contains a low frequency d.c. component from the rectified d.c. input voltage signal and a high frequency a.c.-shaped component from the a.c-shaped high frequency communication input voltage signal. The high frequency a.c.-shaped communication component is superimposed on the low frequency d.c. component to place communication (data) signals on the a.c. power line.

14 Claims, 3 Drawing Sheets

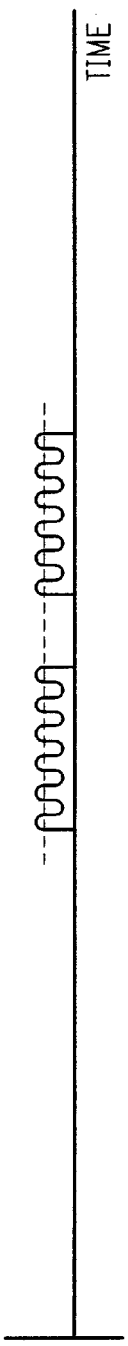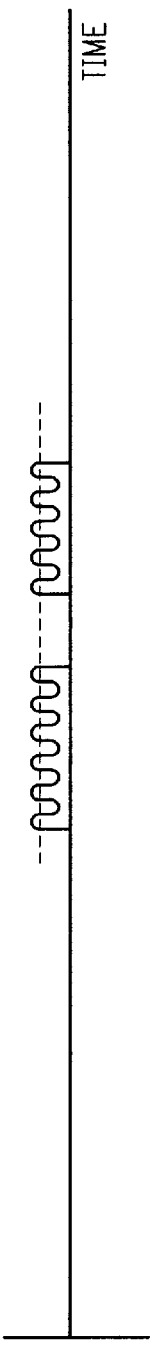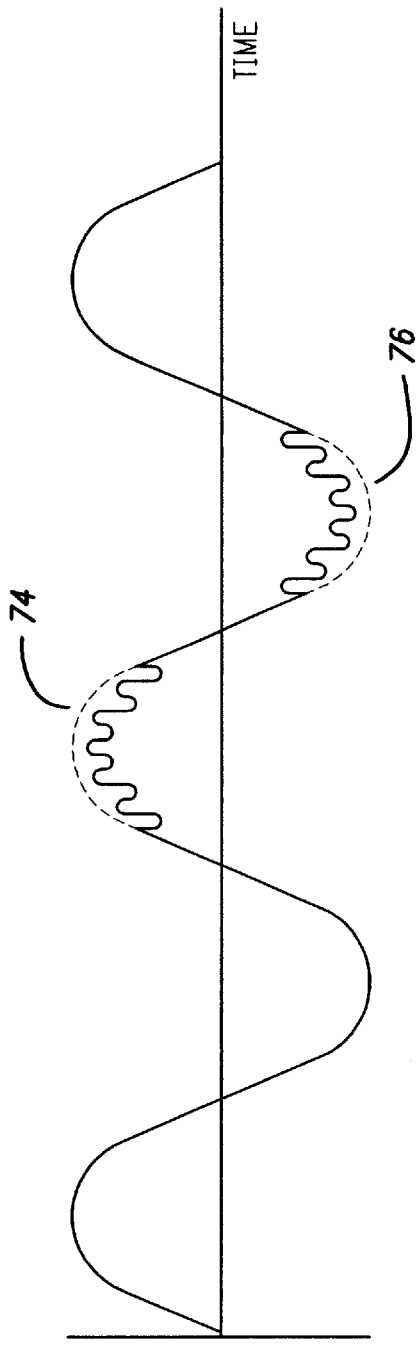
FIG. 5a  
FIG. 5b  
FIG. 5c

POWER LINE COMMUNICATION CIRCUIT

BACKGROUND OF THE INVENTION

1. Field of the Invention

The present invention relates generally to communication circuits and more particularly to a circuit for transmitting a high-frequency communication signal over a regular a.c. power line for line load control.

2. Prior Art

Power line communication circuits are used whenever it is desired to remotely control the operation of a load distributed on the ac. power line at various locations whereby the load may be a house lighting system, alarm system or the like. The prior art has numerous references to relatively complicated and largely inefficient communication circuits which perform various remote control functions over a regular a.c. power line. For example, U.S. Pat. No. 4,024,528 to Boggs et al teaches a remote switching system in which operation of a load is controlled by signals generated at a remote location and transmitted along an a.c. power line. The circuit includes a signal transmitter which is powered by the a.c. power line source and which operates to place a transient control signal on the power line. Further included is a receiver which is electrically connected to the line load for remote control of the same. The control signals are applied to the line during an early time in a half-cycle of the power line voltage before noise transient signals generally appear on the half-cycle. This type of transmission control system has a rather complicated circuit architecture which contributes to an inefficient operation.

Other power line communication systems utilize capacitor or transformer couplings to couple the carrier signal to the power line and expensive push-pull amplifiers to actively supply and draw current to/from the power line. Such power line communication systems also require relatively expensive and powerful power supplies, have inefficient operation and may not be easy to implement in a typical house or office setting.

Therefore, the need arises for a new power line communication circuit which can operate efficiently from a relatively compact and inexpensive power supply which needs to produce, for example, not more than 100 mA. Such a communication circuit should have a simplified circuit architecture in which preferably the coupling of the communication signals to the a.c. power line can be accomplished without the use of capacitors, transformers or the like.

SUMMARY OF THE INVENTION

The present invention is directed to a circuit for transmitting communication signals over an alternating current (a.c.) low-frequency power line, the circuit comprising a rectifier operatively coupled to the a.c. power line for generating an unfiltered rectified direct current (d.c.) voltage signal; and a voltage-to-current converter (VCC) operatively coupled to the rectifier for receiving the unfiltered rectified d.c. voltage signal, the VCC adapted for receiving a high-frequency a.c.-shaped communication voltage signal and for generating an output current in response to the high-frequency a.c.-shaped communication voltage signal and the unfiltered rectified d.c. voltage signal, the output current including a high-frequency a.c. component from the high-frequency a.c.-shaped communication voltage signal superimposed on a low-frequency d.c. component from the unfiltered rectified d.c. voltage signal, the superimposed high-frequency a.c.-shaped signal component placing communication signals on the a.c. power line through the rectifier.

In accordance with one aspect of the present invention, the circuit further comprises a receiver operatively coupled between the rectifier and the VCC for providing a closed loop high-frequency a.c.-shaped communication voltage feedback signal, the high-frequency a.c.-shaped communication voltage feedback signal summed with the high-frequency a.c.-shaped communication voltage signal at a summing junction to control the size and shape of the high-frequency a.c.-shaped communication signal applied to the VCC.

In accordance with another aspect of the present invention, the rectifier comprises a half-wave rectifier. The half-wave rectifier includes a rectifier diode, the rectifier diode having a cathode and an anode, the anode operatively coupled to the a.c. power line for drawing current from the a.c. power line during the positive half cycle of the a.c. power line.

In accordance with yet another aspect of the present invention, the VCC comprises an N-channel field effect transistor (FET) having a source, a drain and a gate, the drain connected in series with the cathode of the rectifier diode for receiving the unfiltered rectified d.c. voltage signal during a positive half cycle of the a.c. power line, and an integrator having a non-inverting input terminal operatively coupled to the summing junction for receiving the summed high-frequency a.c.-shaped communication voltage signal, an inverting input terminal biased by a biasing voltage source, and an output terminal operatively coupled to the gate of the FET, the integrator generating a gate control voltage in response to the high-frequency a.c.-shaped communication voltage signal and the biasing voltage, the gate control voltage applied to the gate of the FET for modulating the output current from the FET, the modulated output current including a high-frequency a.c. component from the high-frequency a.c.-shaped communication voltage signal superimposed on a low-frequency d.c. component from the unfiltered rectified d.c. voltage signal, the superimposed high-frequency a.c.-shaped signal component placing communication signals on the a.c. power line. The VCC further comprises a feedback network operatively coupled between the integrator and a current sensing resistor for stabilizing the voltage output from the integrator, the current sensing resistor operatively coupled to the source of the FET, the feedback network comprising a voltage divider operatively coupled to the current sensing resistor. The feedback network further comprises a lead-lag network including an RC filter coupled in parallel with a resistor, the resistor being part of the voltage divider.

In accordance with still another aspect of the present invention, the receiver includes a first RC filter operatively coupled to the cathode of the rectifier diode for receiving the output current and decoupling the low-frequency d.c. component from the high-frequency a.c.-shaped communication signal component, a second RC filter operatively coupled to the first RC filter for filtering the decoupled high-frequency a.c.-shaped communication signal component, a non-inverting amplifier operatively coupled to the second RC filter for amplifying the filtered high-frequency a.c.-shaped communication signal component, and a feedback resistor operatively coupled between the non-inverting amplifier and the summing junction for closing the feedback loop on the high-frequency a.c.-shaped feedback communication voltage signal.

In accordance with a further aspect of the present invention, the rectifier comprises a full-wave rectifier. The full-wave rectifier includes a four-diode bridge rectifier having a first and second input terminals operatively coupled on the a.c. power line for continuously drawing current from the a.c. power line, a positive output terminal for providing an unfiltered rectified direct current (d.c.) voltage signal, and a negative output terminal, the negative output terminal serving as circuit ground for the circuit.

In accordance with a still further aspect of the present invention, the VCC comprises an N-channel field effect transistor (FET) having a source, a drain and a gate, the drain connected in series with the positive output terminal of the four-diode bridge rectifier for continuously receiving the unfiltered rectified d.c. voltage signal, and an integrator having a non-inverting input terminal operatively coupled to the summing junction for receiving the summed high-frequency a.c.-shaped communication voltage signal, an inverting input terminal biased by a biasing voltage source, and an output terminal operatively coupled to the gate of the FET, the integrator generating a gate control voltage in response to the high-frequency a.c.-shaped communication voltage signal and the biasing voltage, the gate control voltage applied to the gate of the FET for modulating the output current from the FET, the modulated output current including a high-frequency a.c. component from the high-frequency a.c.-shaped communication voltage signal superimposed on a low-frequency d.c. component from the unfiltered rectified d.c. voltage signal, the superimposed high-frequency a.c.-shaped signal component placing communication signals on the a.c. power line through the four-diode bridge rectifier. The VCC further comprises a feedback network operatively coupled between the integrator and a current sensing resistor for stabilizing the voltage output from the integrator, the current sensing resistor operatively coupled to the source of the FET, the feedback network comprising a voltage divider operatively coupled to the current sensing resistor. The feedback network further comprises a lead-lag network including an RC filter coupled in parallel with a resistor, the resistor being part of the voltage divider.

In accordance with a different aspect of the present invention, the receiver includes a first RC filter operatively coupled to the positive output terminal of the four-diode bridge rectifier for receiving the output current and decoupling the low-frequency d.c. component from the high-frequency a.c.-shaped communication signal component, a second RC filter operatively coupled to the first RC filter for filtering the decoupled high-frequency a.c.-shaped communication signal component, a non-inverting amplifier operatively coupled to the second RC filter for amplifying the filtered high-frequency a.c.-shaped communication signal component, and a feedback resistor operatively coupled between the non-inverting amplifier and the summing junction for closing the feedback loop on the high-frequency a.c.-shaped feedback communication voltage signal.

These and other aspects of the present invention will become apparent from a review of the accompanying drawings and the following detailed description of the preferred embodiments of the present invention.

BRIEF DESCRIPTION OF THE DRAWINGS

FIG. 5a is a graph of a typical time waveform of the control voltage applied to the gate of a field effect transistor of the power line communication circuit of the present invention;

FIG. 5b is a graph of a typical time waveform of the output current from the voltage-to-current converter (VCC) of the power line communication circuit of the present invention; and FIG. 5c is a graph of a typical time waveform of the a.c. line voltage in accordance with the present invention.

DETAILED DESCRIPTION OF THE PREFERRED EMBODIMENTS

Figure 1:
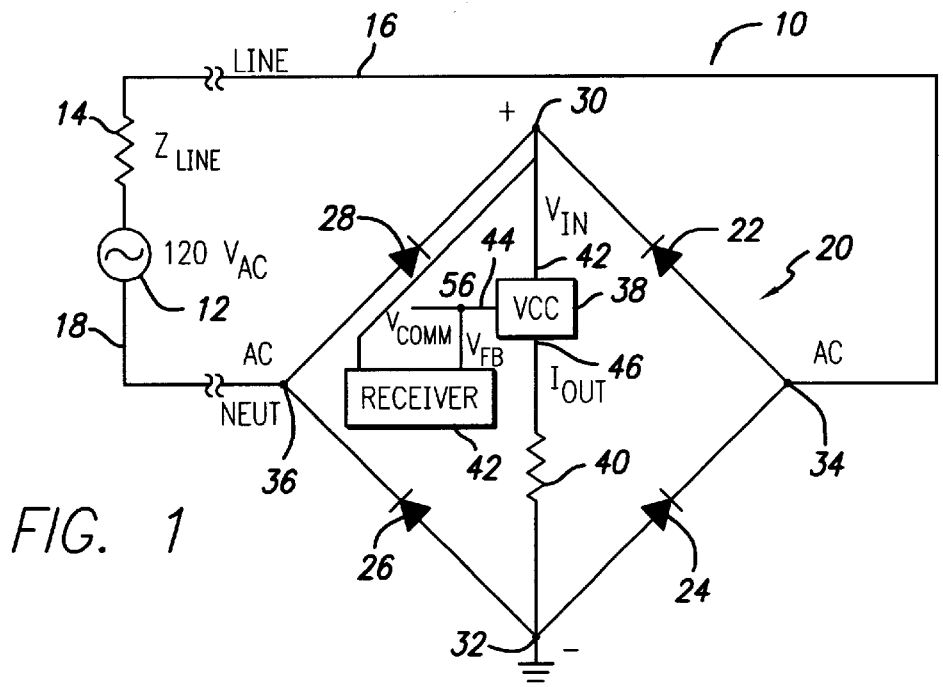
FIG. 1 is a simplified schematic drawing of a power line communication circuit in accordance with the present invention.

Hereinafter, some preferred embodiments of the present invention will be described in detail with reference to the related drawings of FIGS. 1–5c. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The present invention is directed generally to a power line communication circuit which meets the above needs and can be used to control the operation of lights at various locations in a house or office building via actuation of a pre-programmed switch. More specifically, the communication circuit comprises a full-wave bridge rectifier connected in series with a regular a.c. power line utility source (120 V, 60 Hz). The bridge rectifier draws power from the a.c. power source and produces a full-wave rectified d.c. output voltage signal across its positive and negative terminals which is applied to a voltage-to-current converter (VCC) connected in series with a current sensing resistor. The voltage-to-current converter also receives a high frequency input voltage from an external communication (data) signal generator. For the purposes of describing the present invention, the terms "communication" and "data" are used interchangeably. The communication (or data) input signal has an a.c.-shaped waveform which resembles the a.c. power line Waveform but is at a much higher frequency. In response to the two input voltage signals, the voltage-to-current converter generates a current output which has a low frequency d.c. component from the rectified d.c. input voltage and a high frequency a.c. component from the a.c-shaped communication input voltage signal. The high frequency a.c. component is superimposed on the low frequency d.c. component to provide line load control over the a.c. power line.

Referring now more particularly to FIG. 1, an electronic circuit for transmitting communication (data) signals over an a.c. power line for line load control, generally referred to by reference numeral 10, is shown. Circuit 10 has an a.c. power line source 12 (120 V, 60 Hz) connected in series with a resistor 14 which has impedance ($Z_{LINE}$) corresponding to the impedance of the 60 Hz wiring of the house or office building in which the lights control system is installed. Power source 12 has a line lead 16 and a neutral lead 18 which span the entire system.

In accordance with a preferred embodiment of the present invention, power line communication circuit 10 also includes a full-wave rectifier 20 which is preferably a standard four-diode full-wave bridge rectifier available for purchase from electronics supply stores domestically and abroad. Bridge rectifier 20 is electrically connected between lead 16 and lead 18 and drawing a.c. current from the power line via terminals 34, 36, respectively, during consecutive positive and negative half cycles of power line a.c. source 12. Bridge rectifier 20 includes rectifier diodes 22, 28 connected via (positive) output terminal 30 and rectifier diodes 24 and 26 connected, respectively, via (negative) output terminal 32 which, for the intended purpose of the present invention, serves as circuit ground. Other types of full-wave rectifiers may be utilized provided that they fall within the scope of the present invention.

Bridge rectifier 20 rectifies the incoming a.c. power line voltage signal producing a low-frequency (60 Hz) full-wave rectified d.c. voltage signal across its output terminals. The low-frequency full-wave rectified voltage signal is received by a voltage-to-current converter (VCC) 38 connected in series with a current sensing resistor 40 between terminal 30 and terminal 32 of bridge rectifier 20 as shown in FIG. 1. Current sensing resistor 40 is preferably chosen to have a low value resistance for the purposes of the present invention.

Voltage-to-current converter 38 has two input voltage terminals 42, 44 and one current output terminal 46 as illustrated in FIG. 1. Input voltage terminal 42 receives low-frequency full-wave rectified d.c. voltage signal $V_{IN}$ from rectifier 20. Input voltage terminal 44 receives a high-frequency (preferably 115 kHz) communication (data) input voltage signal $V_{COMM}$ (FIG. 1) which has an a.c.-shaped waveform generally resembling the a.c. power line waveform. Upon receiving both input voltage signals ($V_{COMM}$ and $V_{IN}$), voltage-to-current converter 38 generates a corresponding output current $I_{OUT}$ (FIG. 1). $I_{OUT}$ has a low frequency d.c. component from the rectified d.c. input voltage signal and a high frequency a.c. component from the a.c-shaped data input voltage signal. The high frequency a.c. data component is superimposed on the low frequency d.c. component, as will be described hereinbelow, to allow control of the lights at their various house/office building locations. Since $I_{OUT}$ flows through resistor 40 during both the positive and negative half cycles of a.c. power source 12, there is continuous current flow carrying load control data through the system.

The preferred communication (data) signal frequency for practicing the present invention is 115 kHz, although as a person skilled in the art will readily appreciate, other high frequencies may be used. For example, any frequency in the 100 kHz–400 kHz range may be utilized. In this regard it should be noted that the selected data signal frequency should not be higher than 540 kHz which is the starting point for the AM radio band set by the Federal Communications Commission (FCC). The FCC prohibits carrier (transmission signal) frequencies in this range to avoid interference with AM radio transmissions. In general, the higher the transmission data signal frequency, the bigger the bandwidth of data that can be communicated across the a.c. power line. Furthermore, the higher the carrier frequency, the less filtering stages will be required at the receiver end of the system where the low-frequency (60 Hz) rectified d.c. component is decoupled (or stripped) from the high-frequency data component.

Figure 2:
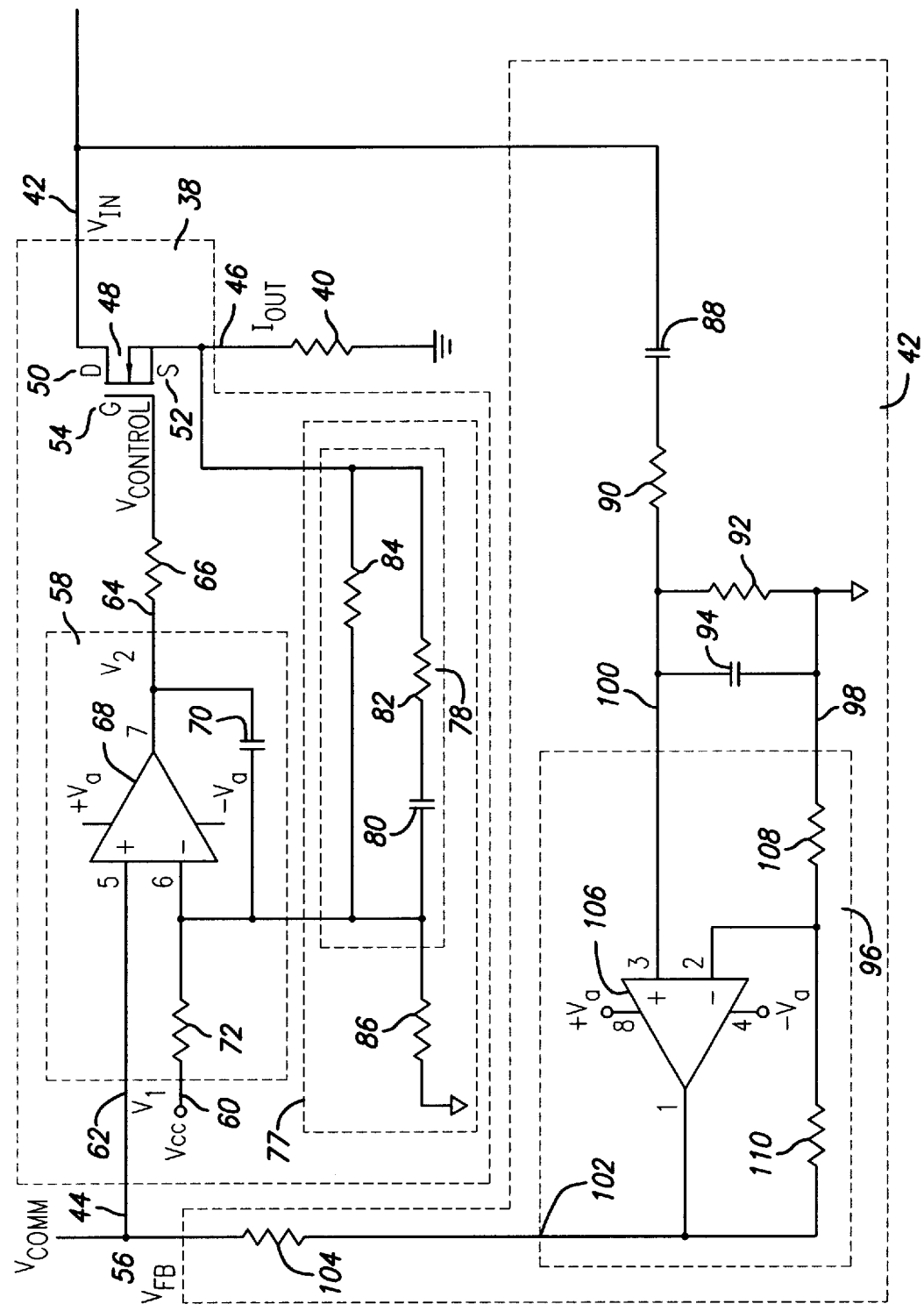
FIG. 2 is a schematic drawing of a power line communication circuit in accordance with the present invention.

Referring to FIG. 2, voltage-to-current converter 38 (shown in dashed lines) includes preferably an N-channel field effect transistor (FET) 48 having a source (S) 52, a drain (D) 50 and a gate (G) 54. As shown in FIG. 2, the potential at drain 50 is $V_{IN}$ and a high frequency input control voltage is being applied at gate 54 resulting in a corresponding modulation of the output current from FET 48. The output current waveform (see FIG. 5b) will have a high frequency (115 kHz) a.c. data component (from the high frequency input control voltage applied to gate 54) superimposed on the low frequency (60 Hz) d.c. component (from the full-wave rectified d.c. input voltage $V_{IN}$ at drain 50). In general, FETs are preferred power devices for high frequency work A variety of other power devices may be used as long as they do not depart from the intended purpose of the present invention.

Voltage-to-current converter 38 also includes an integrator 58 which has an inverting input terminal 60, a non-inverting input terminal 62 and an output terminal 64. Non-inverting input terminal 62 receives a high frequency (115 kHz) data input voltage signal, $V_{COMM}$ which is supplied by an external source (not shown). Integrator output terminal 64 connects to gate 54 of FET 48 via an integrator output resistor 66 (FIG. 2). A biasing voltage $V_{CC}$ (preferably 5V) is applied to the inverting input terminal 60 of integrator 58 via a resistor 72 by a relatively small and efficient power supply (not shown).

Integrator 58 includes a conventional operational amplifier 68 which may be a LM833 operational amplifier manufactured by National Semiconductor Corporation of Santa Clara, Calif. Other operational amplifiers may be selected as long as such other operational amplifiers fall within the scope of the present invention. Operational amplifier 68 is powered by supply voltages $V_a$ and $V_b$ (+8.5 V and –8.5 V, respectively) which are provided by a relatively small and efficient power supply (not shown). Operational amplifier 68 has input pin 5 which serves as non-inverting input terminal 62 of integrator 58, input pin 6 connected to resistor 72, and output pin 7 serving as output terminal for integrator 58. Integrator 58 also includes a negative feedback capacitor 70 connected between pin 7 and pin 6 and resistor 72, as illustrated in FIG. 2.

As a person skilled in the art would readily recognize, if the potential difference between the inverting and non-inverting input terminals of integrator 58 is $V_1$, then the corresponding integrator output $V_2$ will be proportional to [constant$\int V_1$ dt] with the constant given by $-1/R_{72}C_{70}$. Thus, if a positive voltage is applied to pin 5, the output of operational amplifier 68 does not rise instantly to its supply rail, but instead gradually slews to a new position. In general, the greater the gate potential (at gate 54), the wider the depletion channel and the larger the current from FET 48.

Current sensing resistor 40 is preferably picked to have a low resistance value, e.g. about 1 ohm. The inventive circuit is designed to provide for every volt of communication (data) input ($V_{COMM}$) to VCC 38 a corresponding 2V drop ($V_{OUT}$) across resistor 40. Thus, the voltage gain of VCC 38 is $V_{OUT}/V_{COMM}=2$.

In accordance with the best mode for practicing the invention, communication input voltage signal $V_{COMM}$ is generated by an external communication (data) signal generator (not shown) which may be a processor connected to a gate array. The gate array is a complex logic circuit which can be programmed by the user and which, given appropriate commands from the processor, can generate a 115 kHz a.c. voltage signal which is appropriately filtered (not shown) until it bears a close approximation to a sine waveform.

To facilitate transmission of the 115 kHz a.c. voltage signal through VCC 38, a bias offset voltage of approximately 0.5 V (not shown) may be applied to pin 5 of operational amplifier 68. Since the voltage gain of VCC 38 is 2, the 0.5 bias V input will translate into a 1 A current output at terminal 46. Therefore, as long as the 0.5 V offset voltage (±400 mV–500 mV) is kept on pin 5 at all times, any additional input voltage on pin 5 will be carried by the system in its entirety. The additional input voltage is in fact the 115 kHz a.c.-shaped communication (data) input voltage signal $V_{COMM}$ generated by the above-described external communication signal generator which is applied to pin 5. Integrator 58 integrates $V_{COMM}$ and applies a corresponding oscillatory control voltage $V_{CONTROL}$ to gate 54 of FET 48 (via resistor 66) thereby varying the FET bias and forcing the FET channel current to follow $V_{CONTROL}$ (drain 50 is at $V_{IN}$). The output current $I_{OUT}$, therefore, contains a high-frequency (115 kHz) component from $V_{COMM}$ superimposed on a low-frequency (60 Hz) d.c. component from $V_{IN}$ (FIG. 5b). The $I_{OUT}$ waveform closely resembles the $[V_{CONTROL}+V_{IN}]$ waveform FIGS. 5a–5b show both waveforms being in phase. The superimposed a.c. component carries data needed to control the line load (lights in the house, etc.) over the a.c. power line. The resulting $V_{LINE}$ waveform is shown in FIG. 5c—the high-frequency a.c. data component being superimposed on the low frequency d.c. component during a positive half cycle 74 and a negative half cycle 76 of a.c. power source 12. Since the coupling of both signals was achieved by drawing current from the power line, the amplitude of the peak $V_{LINE}$ signal during both cycles is slightly reduced as shown by a dashed line in FIG. 5c, which does not affect the intended purpose of the present invention.

In accordance with the best mode for practicing the invention, transmission of the high-frequency data signal on the a.c. power line is initiated whenever there is at least approximately 30 V on the line during each half cycle. Thus, if transmission is to start on a positive half cycle, transmission does not start until the a.c. power line goes up to 30 V. During the consecutive negative half cycle, the system transmits while there is still 30 V left on the a.c. power line. This mode of operation avoids conventional zero crossing transmissions which require actively applying and drawing current to/from the power line by means of relatively expensive push-pull amplifiers. Furthermore, the inventive system is designed so that as soon as the gate voltage, $V_{CONTROL}$, goes down to about 2 V, FET 48 is turned off. FET 48 is turned off whenever there is no transmission activity on the a.c. power line to avoid overheating. Thus, the power device (FET 48) is "on" for only a very short time and only at certain times of the day/night which makes for a very economical operation.

To more precisely control the gain and reduce distortion, VCC 38 preferably includes a feedback network 77 (shown in dashed lines in FIG. 2) electrically connected between current sensing resistor 40 and integrator 58. Feedback network 77 comprises a voltage divider represented by a resistor 84 connected in series with a resistor 86, the resistors having preferably equal-valued resistance, and a RC filter including a capacitor 80 connected in series with a resistor 82 (FIG. 2). The voltage divider in conjunction with current sensing resistor 40 determines the feedback input voltage at pin 6 of operational amplifier 68. For example, if resistors 84, 86 and 40 are each 1-ohm valued resistors and if pin 5 receives 1 V input, in order for pin 6 to also receive 1 V to keep the output voltage of operational amplifier 68 stable, the amount of current through resistor 40 should be 2 amperes, i.e. for every volt applied to input pin 5 of operational amplifier 68, two amperes of current will be drawn from the a.c. power line.

Feedback network 77 actually includes a lead-lag network 78 (shown in dashed lines in FIG. 2) comprising resistor 84 connected in parallel with the RC filter (resistor 82 and capacitor 80). At low frequencies, the feedback input voltage at pin 6 is determined solely by the voltage divider due to the reactance of capacitor 80, $X_{80}=1/2\pi fC$, i.e. at low frequencies, capacitor 80 acts like an open circuit. Therefore, at low frequencies there would be a voltage lag at pin 6. Conversely, at high frequencies the capacitor acts like a short circuit in which case there would be a voltage lead at pin 6.

It should be noted that operationally VCC 38 may be viewed as a transconductance amplifier in which case the gain would be $I_{OUT}/V_{COMM}$ (in siemens).

In accordance with another preferred embodiment of the present invention, communication circuit 10 also includes a receiver 42 (FIG. 1) connected between input terminal 44 of VCC 38 (FIG. 2) and positive terminal 30 of bridge rectifier 38. As shown in FIG. 2, receiver 42 includes a non-inverting amplifier 96 having a non-inverting input terminal 100, an inverting input terminal 98 and an output terminal 102, a pair of RC filters which provide two poles of filtering and a feedback resistor 104 which feeds into input terminal 44 via a summing node 56. Specifically, non-inverting amplifier 96 includes an operational amplifier 106 preferably identical to operational amplifier 68 and resistors 108, 110 each connected to pin 2 of operational amplifier 106, the resistors being preferably equal-valued resistors. Operational amplifier 106 is powered by supply voltages $V_a$ and $V_b$ (+8.5 V and −8.5 V, respectively) which are provided by a relatively small and efficient power supply (not shown). Pin 3 serves as non-inverting input terminal 100, pin 1 connects to output terminal 102 and pin 2 connects to inverting input terminal 98 via resistor 108. The gain of non-inverting amplifier 96 can be calculated from $A_{96}=(R_{108}+R_{110})/R_{108}=2R_{108}/R_{108}=2$ since resistors 110, 108 are equal-valued resistors.

The first RC filter, represented by a capacitor 88 connected in series between positive terminal 30 of full-wave bridge rectifier 20 and a resistor 90, receives an input voltage signal comprising the high-frequency a.c. data component (from $V_{COMM}$) superimposed on the low frequency rectified d.c. component (from $V_{IN}$) and any other high frequency noise present on the a.c. line such as from dimmer switches and the like. Capacitor 88 has reactance $X_{88}=1/2\pi fC$, i.e. at low frequencies, capacitor 88 acts like an open circuit blocking the passage of the low frequency (60 Hz) d.c. component. At high frequencies, capacitor 88 acts like a short circuit passing the high-frequency (115 kHz) a.c. data component and any other high-frequency noise present on the line. Capacitor 88 thus strips (decouples) the low-frequency rectified d.c. component from the high-frequency a.c. data component and passes the decoupled high-frequency signal to resistor 90. At this point, the second RC filter, comprising a resistor 92 connected in series to resistor 90 and in parallel to a capacitor 94, is employed to complete the signal filtering process. Capacitor 94 which is connected across inverting and non-inverting input terminals 98,100 provides filtered high-frequency a.c. data input voltage to non-inverting amplifier 96. In accordance with the best mode for practicing the invention, capacitors 88, 94 should preferably have equal value capacitance and resistors 90, 92 should preferably have equal value resistance. Capacitor 94 feeds the filtered high-frequency a.c. data voltage to input terminals 100, 98 of non-inverting amplifier 96 which amplifies the same by a gain of 2. The amplified high-frequency a.c. data output signal $V_{FB}$ is then passed through feedback resistor 104 to summing node 56. The high-frequency a.c. communication (data) feedback signal, which should be 180 degrees out of phase relative to the generated high-frequency a.c. communication (data) signal ($V_{COMM}$), is then summed at summing node (junction) 56 with the generated high-frequency a.c. communication (data) signal ($V_{COMM}$) closing the feedback control loop on the high-frequency a.c. input signal component being applied to pin 5 of operational amplifier 68. The high-frequency a.c. voltage error signal produced by the summation of $V_{FB}$ and $V_{COMM}$ is then fed to pin 5 of operational amplifier 68. The closed loop feedback is needed to more accurately control the size and shape of the high-frequency ac. data signal applied to pin 5 of operational amplifier 68.

Figure 3:
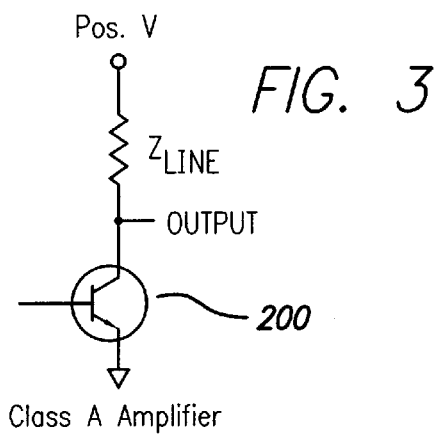
FIG. 3 is a simplified equivalent circuit drawing of the power line communication circuit of FIG. 2.

It should be appreciated by a person skilled in the art that the inventive setup can be viewed as a Class A amplifier. FIG. 3 shows a Class A amplifier 200 with $Z_{LINE}$ referring to the impedance of the house wiring. Class A amplifier 200 is not a very efficient amplifier which is an acceptable trade-off for the intended purpose of the present invention as the power device is only "on" for a half a cycle at a time at certain times of the day. Class A amplifiers are biased in the center of their operating curves so that output current flows during the entire cycle of the input voltage. This results in minimum distortion of the output signal. In general Class A amplifiers have poor efficiency because of power losses in the biasing resistor and the transistor, however, that is not a constraint for the intended purpose of the present invention.

Figure 4:
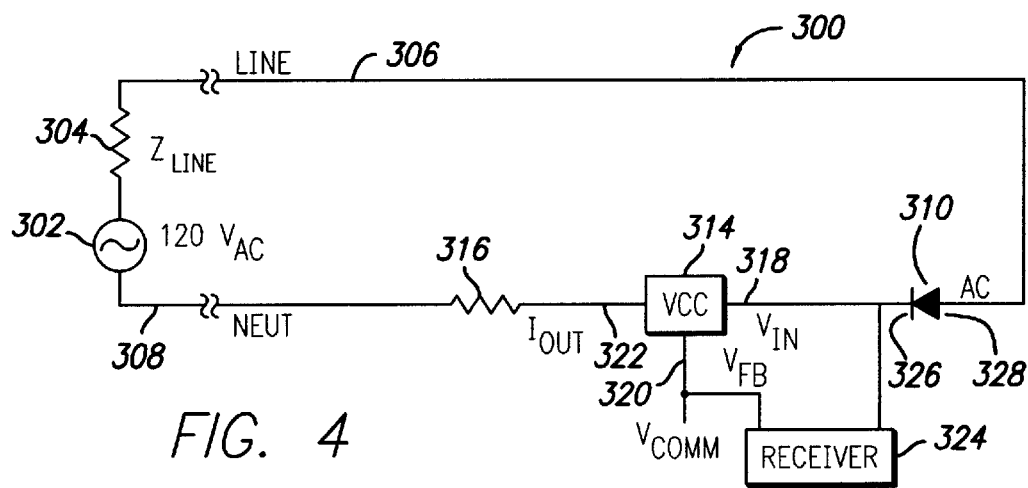
FIG. 4 is a simplified schematic drawing of an alternative embodiment of the present invention.

It should be further appreciated that negative output terminal 32 of full-wave bridge rectifier 20 is also the circuit ground to which the rest of the above-described circuitry is referenced In accordance with an alternative embodiment of the present invention, a circuit for transmitting communication (data) signals over an a.c. utility power line for line load control, generally referred to by reference numeral 300, is shown in FIG. 4. Circuit 300 has an a.c. power line source 302 (120 V, 60 Hz) connected in series with a resistor 304 which has impedance ($Z_{LINE}$) corresponding to the impedance of the 60 Hz wiring of the house (or office building) in which the lights control system is installed. Power source 302 has a line lead 306 and a neutral lead 308 which span the entire system.

Power line communication circuit 300 further includes a rectifier 310 with the rectifier being preferably a half-wave rectifier, i.e. a conventional single rectifier diode having a cathode terminal 326 and an anode terminal 328. Anode terminal 328 is connected to line lead 306 and draws a.c. current from the a.c. line during the positive half cycle of power line source 302. Other types of half-wave rectifiers may be utilized provided that they do not deviate substantially from the intended purpose of the present invention. Rectifier 310 produces a low-frequency (60 Hz) half-wave rectified d.c. voltage signal at cathode terminal 326 which is preferably received by a voltage-to current converter (VCC) 314. VCC 314 has two input voltage terminals 318, 320 and one current output terminal 322 which connects with a current sensing resistor 316. Resistor 316 is connected to neutral lead 308 of a.c. power source 302 and is preferably chosen to have a low value resistance. Input voltage terminal 318 is for receiving a low-frequency (60 Hz) half-wave rectified d.c. voltage signal, $V_{IN}$, from diode 310 being supplied via cathode terminal 326. Input voltage terminal 320 is for receiving a high-frequency (preferably 115 kHz) communication (data) input voltage signal, $V_{COMM}$, which has an a.c.-shaped waveform resembling the a.c. power line waveform. Upon receipt of the two input voltages ($V_{COMM}$ and $V_{IN}$), VCC 314 generates a corresponding output current $I_{OUT}$ at current output terminal 322. $I_{OUT}$ has a low frequency d.c. component from the half-wave rectified d.c. input voltage signal and a high frequency a.c. component from the a.c-shaped data input voltage signal. The high frequency a.c.-shaped data component is superimposed on the low frequency d.c. component in the manner described hereinabove for the full-wave bridge rectifier embodiment and passed via current sensing resistor 316 onto the a.c. power line to place communication (data) signals on the a.c. power line. Since $I_{OUT}$ flows through resistor 316 only during the positive half cycle of a.c. power source 302, communication (data) can be transmitted through the system only half of the time. The structure and operation of VCC 314 is identical to VCC 38 of FIG. 2.

Circuit 300 also includes a receiver 324 connected between input terminal 320 of VCC 314 and cathode terminal 326 of rectifier diode 310. The structure and operation of receiver 324 is identical to receiver 42 of FIG. 2.

The above-described inventive low-voltage circuit can be constructed from inexpensive electronic components and requires a simple, compact and inexpensive power supply which is estimated to be capable of producing only about 100 mA to satisfy the needs of the above-described inventive circuit(s). The circuit architecture is thus greatly simplified in comparison with conventional power line communication circuits and does not employ capacitor/transformer couplings to couple the carrier (data) signal to the a.c. power line.

It should be appreciated by a person skilled in the art that other components and/or configurations may be utilized in the above-described embodiments, provided that such components and/or configurations do not depart from the intended purpose and scope of the present invention.

While the present invention has been described in detail with regards to the preferred embodiments, it should be appreciated that various modifications and variations may be made in the present invention without departing from the scope or spirit of the invention. In this regard it is important to note that practicing the invention is not limited to the applications described hereinabove. Many other applications and/or alterations may be utilized provided that they do not depart from the intended purpose of the present invention.

It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A circuit for transmitting communication signals over an alternating current (a.c.) low-frequency power line, said circuit comprising:

(a) a rectifier operatively coupled to the a.c. power line for generating an unfiltered rectified direct current (d.c.) voltage signal; and (b) a voltage-to-current converter (VCC) operatively coupled to said rectifier for receiving said unfiltered rectified d.c. voltage signal, said VCC adapted for receiving a high-frequency a.c.-shaped communication voltage signal and for generating an output current in response to said high-frequency a.c.-shaped communication voltage signal and said unfiltered rectified d.c. voltage signal, said output current including a high-frequency a.c. component from said high-frequency a.c.-shaped communication voltage signal superimposed on a low-frequency d.c. component from said unfiltered rectified d.c. voltage signal, said superimposed high-frequency a.c.-shaped signal component placing communication signals on the a.c. power line through said rectifier.

2. The circuit of claim 1, further comprising a receiver operatively coupled between said rectifier and said VCC for providing a closed loop high-frequency a.c.-shaped communication voltage feedback signal, said high-frequency a.c.-shaped communication voltage feedback signal summed with said high-frequency a.c.-shaped communication voltage signal at a summing junction to control the size and shape of said high-frequency a.c.-shaped communication signal applied to said VCC.

3. The circuit of claim 2, wherein said rectifier comprises a half-wave rectifier.

4. The circuit of claim 3, wherein said half-wave rectifier includes a rectifier diode, said rectifier diode having a cathode and an anode, said anode operatively coupled to the a.c. power line for drawing current from the a.c. power line during the positive half cycle of the a.c. power line.

5. The circuit of claim 4, wherein said VCC comprises an N-channel field effect transistor (FET) having a source, a drain and a gate, said drain connected in series with said cathode of said rectifier diode for receiving said unfiltered rectified d.c. voltage signal during a positive half cycle of the a.c. power line, and an integrator having a non-inverting input terminal operatively coupled to said summing junction for receiving said summed high-frequency ac.-shaped communication voltage signal, an inverting input terminal biased by a biasing voltage source, and an output terminal operatively coupled to said gate of said FET, said integrator generating a gate control voltage in response to said high-frequency a.c.-shaped communication voltage signal and said biasing voltage, said gate control voltage applied to said gate of said FET for modulating said output current from said FET, said modulated output current including a high-frequency a.c. component from said high-frequency a.c.-shaped communication voltage signal superimposed on a low-frequency d.c. component from said unfiltered rectified d.c. voltage signal, said superimposed high-frequency a.c.-shaped signal component placing communication signals on the a.c. power line.

6. The circuit of claim 5, wherein said VCC further comprises a feedback network operatively coupled between said integrator and a current sensing resistor for stabilizing the voltage output from said integrator, said current sensing resistor operatively coupled to said source of said FET, said feedback network comprising a voltage divider operatively coupled to said current sensing resistor.

7. The circuit of claim 6, wherein said feedback network further comprises a lead-lag network including an RC filter coupled in parallel with a resistor, said resistor being part of said voltage divider.

8. The circuit of claim 4, wherein said receiver includes a first RC filter operatively coupled to said cathode of said rectifier diode for receiving said output current and decoupling said low-frequency d.c. component from said high-frequency a.c.-shaped communication signal component, a second RC filter operatively coupled to said first RC filter for filtering said decoupled high-frequency a.c.-shaped communication signal component, a non-inverting amplifier operatively coupled to said second RC filter for amplifying said filtered high-frequency a.c.-shaped communication signal component, and a feedback resistor operatively coupled between said non-inverting amplifier and said summing junction for closing the feedback loop on said high-frequency a.c.-shaped feedback communication voltage signal.

9. The circuit of claim 2, wherein said rectifier comprises a full-wave rectifier.

10. The circuit of claim 9, wherein said full-wave rectifier includes a four-diode bridge rectifier having a first and second input terminals operatively coupled on the a.c. power line for continuously drawing current from the a.c. power line, a positive output terminal for providing an unfiltered rectified direct current (d.c.) voltage signal, and a negative output terminal, said negative output terminal serving as circuit ground for said circuit.

11. The circuit of claim 10, wherein said VCC comprises an N-channel field effect transistor (FET) having a source, a drain and a gate, said drain connected in series with said positive output terminal of said four-diode bridge rectifier for continuously receiving said unfiltered rectified d.c. voltage signal, and an integrator having a non-inverting input terminal operatively coupled to said summing junction for receiving said summed high-frequency a.c.-shaped communication voltage signal, an inverting input terminal biased by a biasing voltage source, and an output terminal operatively coupled to said gate of said FET, said integrator generating a gate control voltage in response to said high-frequency a.c.-shaped communication voltage signal and said biasing voltage, said gate control voltage applied to said gate of said FET for modulating said output current from said FET, said modulated output current including a high-frequency a.c. component from said high-frequency a.c.-shaped communication voltage signal superimposed on a low-frequency d.c. component from said unfiltered rectified d.c. voltage signal, said superimposed high-frequency a.c.-shaped signal component placing communication signals on the a.c. power line through said four-diode bridge rectifier.

12. The circuit of claim 11, wherein said VCC further comprises a feedback network operatively coupled between said integrator and a current sensing resistor for stabilizing the voltage output from said integrator, said current sensing resistor operatively coupled to said source of said FET, said feedback network comprising a voltage divider operatively coupled to said current sensing resistor.

13. The circuit of claim 12, wherein said feedback network further comprises a lead-lag network including an RC filter coupled in parallel with a resistor, said resistor being part of said voltage divider.

14. The circuit of claim 10, wherein said receiver includes a first RC filter operatively coupled to said positive output terminal of said four-diode bridge rectifier for receiving said output current and decoupling said low-frequency d.c. component from said high-frequency a.c.-shaped communication signal component, a second RC filter operatively coupled to said first RC filter for filtering said decoupled high-frequency a.c.-shaped communication signal component, a non-inverting amplifier operatively coupled to said second RC filter for amplifying said filtered high-frequency a.c.-shaped communication signal component, and a feedback resistor operatively coupled between said non-inverting amplifier and said summing junction for closing the feedback loop on said high-frequency a.c.-shaped feedback communication voltage signal.

* * * * *